(12) United States Patent
Yavuz

(10) Patent No.: US 10,318,754 B2
(45) Date of Patent: Jun. 11, 2019

(54) SYSTEM AND METHOD FOR SECURE REVIEW OF AUDIT LOGS

(71) Applicant: Robert Bosch GmbH, Stuttgart (DE)

(72) Inventor: Attila Altay Yavuz, Corvallis, OR (US)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 15/315,008

(22) PCT Filed: Jun. 2, 2015

(86) PCT No.: PCT/US2015/033699
§ 371 (c)(1),
(2) Date: Nov. 30, 2016

(87) PCT Pub. No.: WO2015/187640
PCT Pub. Date: Dec. 10, 2015

(65) Prior Publication Data
US 2017/0103228 A1 Apr. 13, 2017

Related U.S. Application Data

(60) Provisional application No. 62/006,476, filed on Jun. 2, 2014.

(51) Int. Cl.
*H04L 9/08* (2006.01)
*H04L 9/14* (2006.01)
(Continued)

(52) U.S. Cl.
CPC ........ *G06F 21/6227* (2013.01); *G06F 21/606* (2013.01); *H04L 9/083* (2013.01);
(Continued)

(58) Field of Classification Search
CPC ............... G06F 21/606; G06F 21/6227; G06F 2221/2101; H04L 9/3247; H04L 9/0861; H04L 9/0891; H04L 9/14; H04L 9/083
(Continued)

(56) References Cited

U.S. PATENT DOCUMENTS 9,355,271 B2 5/2016 Yavuz et al.
2010/0002875 A1\* 1/2010 Li ..................... H04N 7/1675
380/42

(Continued)

OTHER PUBLICATIONS

Attila, Yavuz A. et al., "BAF and FI-BAF: Efficient and publicly verifiable cryptographic schemes for secure logging in resource-constrained systems", ACM Transactions on Information and System Security, vol. 15, No. 2, Article 9, Jul. 2012 (28 pages).
(Continued)

*Primary Examiner* — Kambiz Zand
*Assistant Examiner* — Benjamin A Kaplan
(74) *Attorney, Agent, or Firm* — Maginot Moore & Beck LLP

(57) ABSTRACT

Audit logs are a fundamental digital forensic mechanism for providing security in computer systems. In one embodiment, a system that enables the verification of log data integrity and that provides searchable encryption of the log data by an auditor includes a key generation center, logging machine, and an auditor computing device. The system enables Compromise-Resilient Searchable Encryption, Authentication and Integrity, Per-item QoF with E&A for Searchable Encrypted Audit Logs, and a Key Management and System Model.

18 Claims, 3 Drawing Sheets

(51) Int. Cl.
H04L 9/32 (2006.01)
G06F 21/60 (2013.01)
G06F 21/62 (2013.01)
(52) U.S. Cl.
CPC .......... *H04L 9/0861* (2013.01); *H04L 9/0891* (2013.01); *H04L 9/14* (2013.01); *H04L 9/3247* (2013.01); *G06F 2221/2101* (2013.01)
(58) Field of Classification Search
USPC ...................................................... 713/165
See application file for complete search history.

(56) References Cited

U.S. PATENT DOCUMENTS

| | | | | |
|---|---|---|---|---|
| 2010/0211781 | A1* | 8/2010 | Auradkar | G06F 21/6209 713/168 |
| 2013/0159695 | A1* | 6/2013 | Chiueh | G06F 21/6227 713/150 |
| 2015/0082048 | A1* | 3/2015 | Ferguson | G06F 21/602 713/189 |
| 2015/0254344 | A1* | 9/2015 | Kulkarni | G06F 17/30799 707/747 |
| 2017/0111362 | A1* | 4/2017 | Xie | H04L 63/101 |

OTHER PUBLICATIONS

Ma, Di et al., "A New Approach to Secure Logging", ACM Transactions on Storage, vol. 5, No. 1, Article 2, Mar. 2009 (21 pages).
Crosby, Scott A. et al., "Efficient Data Structures for Tamper-Evident Logging", in Proceedings of the 18th conference on USENIX Security Symposium, Aug. 2009 (11 pages).
Ma, Di et al., "Forward-secure sequential aggregate authentication," IACR Cryptology ePrint Archive, 2007 (10 pages).
Wang, Yongge et al., "Fast and Secure Magnetic WORM Storage Systems", Second IEEE International Security in Storage Workshop, 2003 (9 pages).
Hsu, W. W. et al., "Technical forum: WORM storage is not enough," IBM System Journal, vol. 46, No. 2, pp. 363-369, 2007 (7 pages).
Oprea, Alina et al., "Authentic time-stamps for archival storage", in Proceedings of the 14th European Symposium on Research in Computer Security (ESORICS '09), 2009 (25 pages).
Fall, Kevin, "A Delay-Tolerant Network Architecture for Challenged Internets", in the Proceedings of the 9th Conference on Applications, Technologies, Architectures, and Protocols for Computer Communications (SIGCOMM'03), Aug. 2003 (8 pages).
Yavuz, Attila A. et al., "Hash-Based Sequential Aggregate and Forward Secure Signature for Unattended Wireless Sensor Networks", in Proceedings of the 6th Annual International Conference on Mobile and Ubiquitous Systems (MOBIQUITOUS2009), Jul. 2009 (10 pages).
Dodis, Yevgeniy et al., "Key-Insulated Public Key Cryptosystems", In Proceedings of the 21st International Conference on the Theory and Applications of Cryptographic Techniques (EUROCRYPT'02), 2002 (18 pages).
Bellare, Mihir et al., "Forward Security in Private-Key Cryptography", in Proceedings of the Cryptographers Track at RSA Conference (CT-RSA '03), 2003 (18 pages).
Holt, Jason E., "Logcrypt: Forward Security and Public Verification for Secure Audit Logs", in Proceedings of the 4th Australasian Information Security Workshop (AISW-NetSec 2006), 2006, (9 pages).
Ma, Di, "Practical Forward Secure Sequential Aggregate Signatures", in Proceedings of the ACM Symposium on Information, Computer and Communications Security (ASIACCS '08), Mar. 2008 (12 pages).
Yavuz, Attila A. et al., "BAF: An Efficient Publicly Verifiable Secure Audit Logging Scheme for Distributed Systems", in Proceedings of Annual Computer Security Applications Conference (ACSAC '09), 2009 (10 pages).

Abdalla, Michel et al., "A New Forward-Secure Digital Signature Scheme", in Advances in Cryptology (ASIACRYPT 00), 2000 (14 pages).
Bellare, Mihir et al., "Forward Integrity for Secure Audit Logs", San Diego, CA, USA, Tech. Rep. 1997 (16 pages).
Schneier, Bruce et al., "Cryptographic Support for Secure Logs on Untrusted Machines", in Proceedings of Conference on USENIX Security Symposium, USENIX Association, 1998 (10 pages).
Ma, Di et al., "A New Approach to Secure Logging", DAS 2008, LNCS 5094, pp. 48-63, 2008 (16 pages).
Schneier, Bruce et al., "Secure Audit Lokgs to Support Computer Forensics", ACM Transactions on Information and System Security, vol. 2, No. 2, May 1999 (18 pages).
Mass, Martijn, "Pairing-Based Cryptography", Master's Thesis, Technische Universiteit Eindhoven, 2004 (92 pages).
Yavuz, Attila A. et al., "Efficient, Compromise Resilient and Append-only Cryptographic Schemes for Secure Audit Logging", in Proceedings of 2012 Financial Cryptography and Data Security, Mar. 2012 (15 pages).
Yavuz, Attila A. et al., "Self-sustaining, efficient and forward-secure cryptographic constructions for Unattended Wireless Sensor Networks", Ad Hoc Networks, vol. 10, No. 7, pp. 1204-1220 , 2012 (17 pages).
Chong, Cheun Ngen et al., "Secure Audit Logging with Tamper-Resisting Hardware", In Proceedings of the 18th IFIP International Information Security Conference, Kluwer Academic Publishers, pp. 73-84, 2003 (12 pages).
Maniatis, Petros et al., "Authenticated Append-only Skip Lists", Cornell University Library, submitted on Feb. 7, 2003, retrieved from internet: https://arxiv.org/abs/cs/0302010 (24 pages).
Papamanthou, Charalampos et al., "Authenticated Hash Tables", in Proceedings of the 15th ACM Conference on Computer and Communications Security (CCS '08), 2008 (12 pages).
Anagnostopoulos, Aris et al., "Persistent Authenticated Dictionaries and Their Applications", in Proceedings of Information Security Conference (ISC '01), 2001 (15 pages).
Waters, Brent R. et al., "Persistent Authenticated Dictionaries and Their Applications", in Proceedings of the Network and Distributed System Security Symposium (NDSS '04), 2004 (10 pages).
Boneh, Dan et al., "Identity-Based Encryption from the Weil Pairing", appears in SIAM J. of Computing, vol. 32, No. 3, pp. 586-615, 2003, retrieved from internet: https://crypto.stanford.edu/~dabo/papers/bfibe.pdf (31 pages).
Boneh, Dan et al., "Public Key Encryption with Keyword Search", in Proceedings of the 23rd International Conference on the Theory and Applications of Cryptographic Techniques (EUROCRYPT '04), 2004, pp. 506-522 (17 pages).
Davis, Darren et al., "Time-Scoped Searching of Encrypted Audit Logs", in Proceedings of the 6th International Conference on Information and Communications Security (ICICS '04), 2004, pp. 532-545 (14 pages).
Curtmola, Reza et al., "Searchable Symmetric Encryption: Improved Definitions and Efficient Constructions", in the Proceedings of the 13th ACM Conference on Computer and Communications Security (CCS '06), 2006, pp. 79-88 (10 pages).
Kamara, Seny et al., "Dynamic Searchable Symmetric Encryption" in Proceedings of the 2012 ACM Conference on Computer and Communications Security (CCS '12), Oct. 2012, pp. 965-976 (12 pages).
Goh, Eu-Jin, "Secure Indexes", Cryptology ePrint Archive, Report 2003/216, 2003, retrieved from internet: https://eprint.iacr.org/2003/216.pdf (18 pages).
Kamara, Seny et al., "Parallel and Dynamic Searchable Symmetric Encryption", in Financial Cryptography (FC 2013), 2013, pp. 258-274 (17 pages).
Van Liesdonk, Peter et al., "Computationally Efficient Searchable Symmetric Encryption", Secure Data Management, Springer-Verlag Berlin Heidelberg, 2010, pp. 87-100 (14 pages).
Krawczyk, Hugo, "The Order of Encryption and Authentication for Protecting Communications (or: How Secure Is SSL?)", in Proceedings of the 21st Annual International Cryptology Conference on Advances in Cryptology (CRYPTO 01), 2001, pp. 310-331 (22 pages).

(56) References Cited

OTHER PUBLICATIONS

Krawczyk, Hugo et al., "HMAC: Keyed-Hashing for Message Authentication", IETF RFC 2104, Feb. 1997, retrieved from internet: https://www.rfc-editor.org/rfc/pdfrfc/rfc2104.txt.pdf (11 pages).

Song, Dawn et al., "Practical Techniques for Searches on Encrypted Data," IEEE Symposium on Security and Privacy, 2000. S&P 2000. Proceedings, 2000 (12 pages).

Supplementary European Search Report corresponding to European Patent Application No. 15 80 3388 (6 pages).

Waters, B. R. et al., "Bulding an Encrypted and Searchable Audit Log," In 11th Annual Network and Distributed System Security Symposium, 2004, retrieved from internet: http://citeseerx.ist.psu.edu/viewdoc/summary? doi=10.1.1.3.2936 (10 pages).

Ohtaki, Y., "Partial Disclosure of Searchable Encrypted Data with Support for Boolean Queries," 2008 Third International Conference on Availability, Reliability and Security, 2008 (8 pages).

\* cited by examiner

SYSTEM AND METHOD FOR SECURE REVIEW OF AUDIT LOGS

CLAIM OF PRIORITY

This application is a 35 U.S.C. § 371 National Stage Application of PCT/US2015/033699, filed on Jun. 2, 2015, which claims the benefit of priority to U.S. Provisional Application No. 62/006,476, filed on Jun. 2, 2014 and entitled "System and Method for Secure Review of Audit Logs," the disclosures of which are incorporated herein by reference in their entireties.

FIELD

This disclosure relates generally to the fields of information security, and, more particularly, to systems and methods for searchable encryption and secure access to log data in computing systems.

BACKGROUND

In operation of computing systems, log files provide diagnostic information about the operation of one or more software programs and often provide information about the activities of users who access the computing system. Since log files maintain a record of past activity, these files are commonly used in computer forensics and auditing to identify malfunctions in the operation of software programs and to identify the presence and activities of intruders if a computing system is attacked. Providing information about the current and past states of systems, audit logs are invaluable parts of system security. The forensic value of audit logs makes them an attractive target for attackers. For instance, an active attacker controls a logging machine that can read and/or modify log messages related to the past and erase records of the previous break-in attempts from the attacker.

Protection of the integrity and authentication of audit logs to valid parties while preventing access or corruption of the logs in the presence of active attackers is important during forensic analysis of a computing system. Due to their significant forensic value, the confidentiality of audit logs is also very important and should be protected against the active adversaries. In particular, the ability to perform searches on audit logs without compromising their privacy, authentication, and integrity, even in the presence of active attacker is highly desirable but very challenging research task. Consequently, improvements to the generation and access of audit logs in computing systems would be beneficial.

SUMMARY

The embodiments described herein provide searchable encrypted log files with integrity and authentication in an environment where the computing device that generates the log files is susceptible to an attacker. The embodiments provide compromise-resilient searchable encryption, authentication and integrity. The audit logging systems and processes described below enable encrypted searches on audit logs by preserving forward-secure encryption, authentication and integrity simultaneously. That is, even if an attacker compromises the logging machine and recovers cryptographic keys, all log messages and SR that were encrypted and signed before the compromise will remain confidential from the attacker. Additionally, if the attacker tampers with the contents of the previously generated log messages and SRs, then the tampering will be evident since the corresponding cryptographic signatures for the log messages and SRs will not match the tampered log messages, and the attacker cannot regenerate new signatures for previously generated log messages.

The embodiments described below enable per-item Quality of Forward Security (QoF) with encryption & authentication (E&A) for Searchable Encrypted Audit Logs. The per-item QoF is implemented with the recommended order of encryption and authentication for forward-secure searchable encryption and authentication. Hence, the embodiments described herein provide superior security and privacy compared to the previous secure cryptographic audit logging methods that cannot achieve all these properties simultaneously.

The embodiments described below implement a key management and system model. Integrating searchable encryption (SE) with forward-secure encryption, authentication, integrity and signature aggregation require a new system model. In particular, a computing device that implements logging permits an approved auditor computing device to check the authentication and integrity of audit logs, but may not allow the decryption of audit logs due to the confidentiality requirements. In one embodiment of the key management and system model, the auditor verifies the forward-secure and aggregate signatures and conducts encrypted searches. However, the auditor must interact with a trusted third party or the KGC to be able to decrypt the encrypted search results, so the auditor does not have full access to the plaintext log messages in log files without additional authorization from the KGC.

In one embodiment, a method for searching encrypted log messages has been developed. The method includes generating with a logging machine a first log message include first plaintext content, identifying with the logging machine at least one keyword in the first log message, encrypting with the logging machine the first log message using a first cryptographic key to produce a first encrypted log message, generating with the logging machine a first encrypted searchable representation of the first message including the at least one keyword using a second cryptographic key, the second cryptographic key being different than the first cryptographic key, transmitting with the logging machine the first encrypted searchable representation to an auditor, performing with the auditor a search to identify at least one search keyword in the first encrypted searchable representation, the auditor using the second cryptographic key to access the first encrypted searchable representation, and generating with the auditor a first output indicating presence or absence of the at least one search keyword from the first log message, the first output not including the first plaintext content of the first log message.

In another embodiment, an encrypted log generation and audit system has been developed. The system includes a logging machine communicatively coupled to an auditor. The logging machine is configured to generate a first log message include first plaintext content, identify at least one keyword in the first log message, encrypt the first log message using a first cryptographic key to produce a first encrypted log message, generate a first encrypted searchable representation of the first message including the at least one keyword using a second cryptographic key, the second cryptographic key being different than the first cryptographic key, and transmit the first encrypted searchable representation to the auditor. The auditor is configured to perform a search to identify at least one search keyword in the first encrypted searchable representation, the auditor using the second cryptographic key to access the first encrypted searchable representation and generate a first output indicating presence or absence of the at least one search keyword from the first log message, the first output not including the first plaintext content of the first log message.

DETAILED DESCRIPTION

Figure 1:
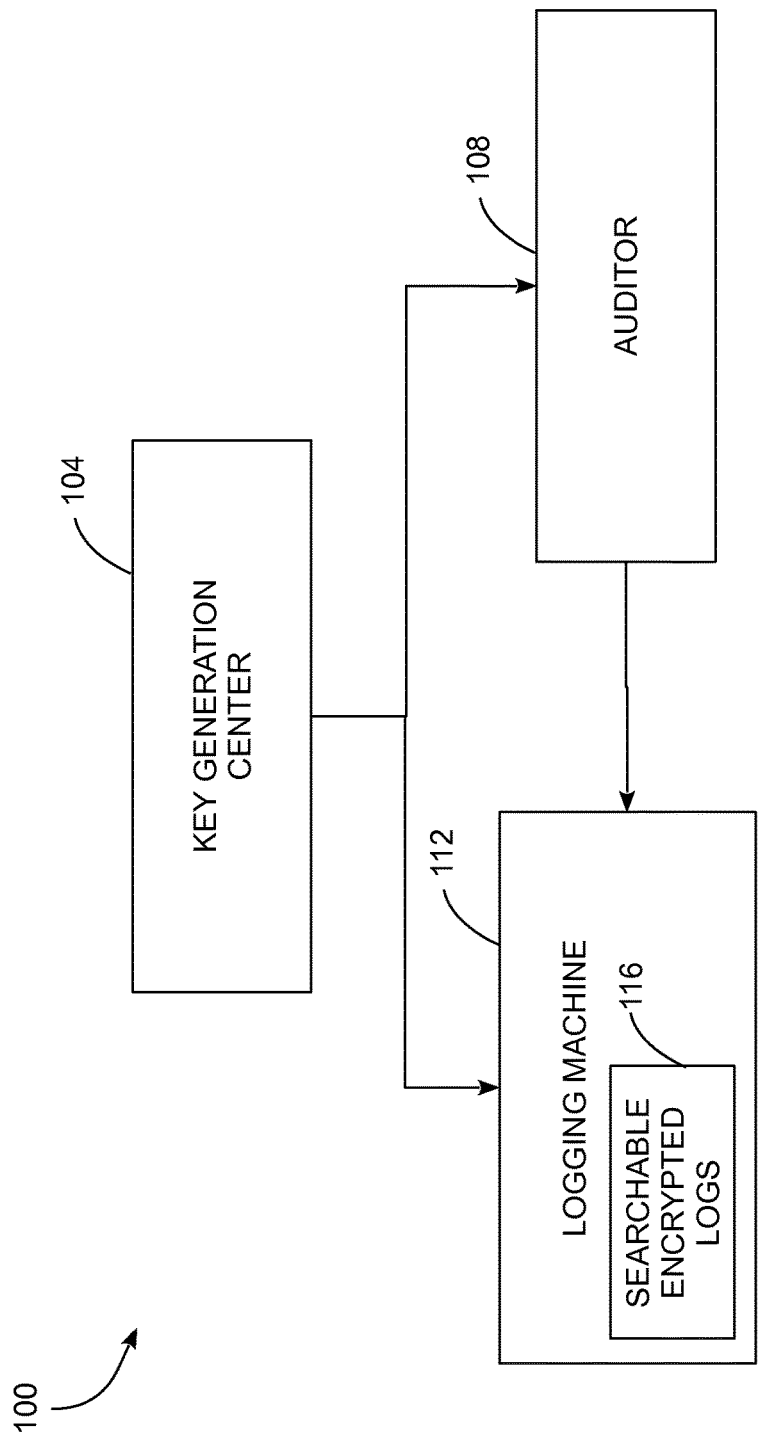
FIG. 1 is a diagram of a computing system that generates encrypted logs and provides a process for auditing the encrypted log data without exposing full plaintext log data to the auditor.

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

Definitions that pertain to the systems and methods described herein are set forth below. Operators $\|$ and $|x|$ denote the concatenation operation and the bit length of variable x, respectively. $x \xleftarrow{\$} S$ denotes that variable x is randomly and uniformly selected from set S. For any integer l, $(x_0, \ldots, x_l) \xleftarrow{\$} S$ means $(x_0 \xleftarrow{\$} S, \ldots, x_l \xleftarrow{\$} S)$. $|S|$ denotes the cardinality of set S. $\{x_i\}_{i=0}^l$ denotes $(x_0, \ldots, x_l)$. The term $\{0, 1\}^*$ denotes the set of binary strings of any finite length. Variable $\kappa$ is an integer that denotes a security parameter.

$\varepsilon$=(Enc, Dec, Gen) is an IND-CPA secure symmetric key encryption scheme, which is includes three algorithms: $z1 \leftarrow \varepsilon.\text{Gen}(1^\kappa)$ is a probabilistic polynomial time (PPT) algorithm that takes a security parameter $\kappa$ and returns a secret key $z_1$; $c \leftarrow \varepsilon.\text{Enc}_{z1}(M)$ takes secret key $z_1$ and a message M, and returns a ciphertext c; $M \leftarrow \varepsilon.\text{Dec}_{z1}(c)$ is a deterministic algorithm that takes $z_1$ and c, and returns M if $z_1$ was the key that was used to generate the ciphertext c. The term "IND-CPA" refers to an encryption scheme where the encryption results of two or more plaintexts are indistinguishable to an attacker ("IND") and where the attacker has the capability to generate encrypted texts for any arbitrarily chosen plain text ("CPA") using, for example, an oracle that generates the encrypted text even if the attacker does not have access to a secret key that performs the encryption. The embodiments presented here employ symmetric key cryptographic schemes for the encryption of data and the generation of cryptographic signatures.

F: $\{0, 1\}^\kappa \times \{0, 1\}^* \rightarrow \{0, 1\}^{2\kappa}$ is a keyed Message Authentication Code (e.g., a hash message authentication code (HMAC)) as $\tau \leftarrow F_{z2}(w)$, which takes a secret key $z_2 \xleftarrow{\$} \{0,1\}^\kappa$ and a message M, and returns an output $\tau$. The MAC is one form of cryptographic signature that requires knowledge of the secret key ($z_2$) in order to produce a valid signature. If an attacker tampers with a log message without knowledge of the secret key $z_2$, then the corresponding cryptographic signature does not match the modified log message data, and the attacker cannot produce a valid signature for the modified log message. In some embodiments, a logging machine uses one secret key (e.g. the key $z_2$) to perform both encryption to produce an encrypted SR for a log message and to produce a cryptographic signature for the SR. Similarly, the logging machine uses another secret cryptographic key (e.g. the key $z_1$) to encrypt the plaintext contents of a log message and to generate a cryptographic signature of either the plaintext or ciphertext contents of the log message.

$\text{Upd}_1$ is a key update function as $k_{i+1} \leftarrow \text{Upd}_1(k_i)$, which takes a symmetric cryptographic key as the input, updates the symmetric key input with a one-way cryptographic hash function, and returns the output of the one-way hash function. $\text{Upd}_1$ deletes the old key $k_i$ after $k_{i+1}$ is computed. The output $k_{i+1}$ is used as another symmetric cryptographic key, and a computing device optionally generates multiple keys using the key update function, $\text{Upd}_1$. The $\text{Upd}_2$ function is another key update function. $\text{Upd}_2$ takes a set of symmetric cryptographic keys as the input, updates both of the symmetric cryptographic keys as described in $\text{Upd}_1$ to produce a pair of updated symmetric cryptographic keys. As described below, a logging machine uses the $\text{Upd}_2$ function to generate updated cryptographic keys for both encrypting log messages and generating encrypted SRs of the log messages, while the auditor machine uses the function $\text{Upd}_1$ to update a copy of the cryptographic key that the logging machine uses to generate the encrypted SRs. The auditor uses the updated keys to search for keywords in the encrypted SRs that the logging machine generates using the corresponding updated secret keys.

The term $t_w$ denotes a single time interval, which is formed from two consecutive pre-determined time points $T_{w-1}$ and $T_w$, $T_w > T_{w-1}$. $t_{w,w'}$ denotes a unified time interval, which starts at the beginning of $t_w$ and ends at the end of $t_{w'}$.

A Searchable Representation (SR) is an encrypted data structure that enables encrypted searches in searchable encryption schemes. The searchable representation SR for each of the messages M is denoted as I, and a set of searchable representations for multiple messages is denoted as $\vec{I} = (I_0, \ldots, I_n)$. In a symmetric encryption system, one computing system uses a cryptographic key to generate the encrypted SR and other parties, including attackers, cannot identify if a keyword is present in the SR without having a copy of the encryption key to perform a search operation that effectively "decrypts" the SR to enable searches for one or more keywords. A computing device that has a copy of the encryption key can search for one or more search keywords to determine if the search keywords are present or absent from the original message text. However, the encrypted SR does not enable the searching party to regenerate the complete original plaintext of the message. An SR can also be signed using a symmetric key to ensure that Multiple searchable representations data structures including encrypted matrix and encrypted red-black trees or other binary tree structures are known to the art and are not discussed in greater detail herein.

In the embodiments below, each message M is also referred as a log message that is recorded by a logging machine. During a searching process, an auditor device searches for keywords that are contained in one or more of the messages M and are encrypted for use in a searchable encryption process. The contents of M may correspond to a stand-alone message in which the entire message M is simply a keyword w, or the message M may include multiple sub-messages with $M = w_0, \ldots, w_l$). Hence, once M is used to generate or update an SR, the keywords in the message M form the basis for updating the SR. That is, message (log message) M is considered as a file f, which is used to generate or update an SR in searchable encryption schemes. The term c denotes the corresponding ciphertext of message M computed under $z_1$ via Enc.

The embodiments described below use a Dynamic Symmetric Searchable Encryption (DSSE) scheme. Examples of DSSE functions in the DSSE scheme are set forth below. The function (I, c)←SSE.Enc$_K$ (M) takes a message M and a set of secret keys K=($z_1$,$z_2$) as input; and it returns I and c as SR and the ciphertext of M, respectively. The function extracts keywords from M (if M is a stand-alone message it is accepted as the keyword itself) and produces an encrypted data structure to obtain the SR, such as an encrypted red-black tree or encrypted binary matrix, using the secret key $z_2$. The function also encrypts the message with secret key $z_1$.

The function (I, c)←SSE.Add$_K$ (I, M) takes a message M and the current SR I as inputs and returns I and c as an updated SR and ciphertext of M, respectively. The function extracts keywords from M (if M is a stand-alone message it is accepted as the keyword itself) and adds the extracted keywords to the encrypted data structure to obtain an updated SR. The function also encrypts the message with secret key $z_1$.

The function (c, b)←SSE.Search$_{z2}$ (I, w) takes a keyword w, an SR I and secret key $z_2$ as inputs and returns a ciphertext c and a bit b. The function returns ciphertexts that contain keyword w and sets b=1, else it returns "null" as ciphertext and sets b=0 in situations where a keyword w is not present in the SR I.

The embodiments that are described below are configured for operation in a forward-secure threat/security model that enables aggregate authentication and integrity aspects; and the security model for searchable encryption. The system employs a forward-secure key update strategy for secret keys that are used for searchable encryption scheme. The security model described below does not have limited time of validity. That is to say, the forward-security is effectively permanent for at least the useful lifetime of the audit logs instead of only being valid for a comparatively short finite time interval. The security model also encapsulates the confidentiality with a search property. The system updates the SR properties to implement an encrypt-and-authenticate (E&A) scheme.

The thread model is directed to a resourceful but Probabilistic Polynomial Time (PPT) bounded attacker A. The attacker A has the following abilities: (i) passive attacks against output of cryptographic operations, (ii) active attacks including log interception/modification, and (iii) physically compromising logging machines (referred to as a "break-in") and extracting the cryptographic keys from the compromised logging machines.

The attacker A aims to produce an existential forgery against the forward-secure and aggregate signature of the accumulated data that that A obtains after a break-in. A may use any cryptographic key and data that is extracted from the compromised logging machines. Similarly, A may use extracted keys to attack the searchable encryption scheme for the searchable representations I.

The forward security in the systems presented below implements Quality of Forward Security (QoF). QoF is a performance-forward security quality trade-off, which is adjusted on a per-item or per-interval basis. On per-item basis, each data message $M_j$ is encrypted and signed as soon as the message is collected. On a per-interval basis, a group of data items $M_j$' is encrypted and signed as a single data item for each time period $t_j$, where $D_j$ denotes all individual data items collected in $t_j$.

In terms of the key evolving strategy, these two methods are the same. However, they enable users to establish a performance-security trade-off that can be decided according to the requirements of application. That is, per-item QoF provides the highest quality of forward security (i.e., forward-security of each data item individually), but it incurs high computational and storage overhead to the signers and verifiers. In contrast, per-interval QoF provides a low quality of forward security (i.e., only for across time periods), but it also incurs less computational and storage overhead to the signers and verifiers. The embodiments described below implement per-item QoF. As is known in the art, the logging machine described below that generates log messages and SR of the log messages first performs encryption and then generates authentication data of the encrypted messages using a MAC function in an encrypt-and-authenticate procedure.

FIG. 1 depicts an illustrative embodiment of a system 100 that enables auditing of encrypted log messages in one or more encrypted log files. The system 100 includes a Key Generation Center (KGC) 104, an auditor 108, and a logging machine 112. In the illustrative embodiment of FIG. 1, each of the KGC 104, auditor 108, and logging machine 112 depict a computing device with one or more digital processors that execute stored program instructions. In distributed embodiments, some or all of the KGC 104, auditor 108, and logging machine 112 are embodied as different hardware devices that are communicatively coupled via a data network or other communication channel. While FIG. 1 depicts a single logging machine 112, in many embodiments the system 100 includes multiple logging machines 112 that correspond to multiple computing devices in a networked computing system. The system 100 includes a single auditor 108 or a comparatively small number of auditors 108 for a larger number of the logging machines 112. In an embodiment with multiple logging machines, each logging machine 112 receives a unique set of cryptographic keys from the KGC 104 and the corresponding auditor 108 receives a shared secret key that is unique to each logging machine.

As used herein, the term "key generation center (KGC)" refers to one or a plurality of computing devices, such as the KGC 104, that collaborate to provide system-wide generation of key material, distribution, and optionally key escrow operations for the logging system 100, which includes generation and distribution of symmetric cryptographic keys. Operation of the system 100 relies on the KGC as part of the trusted computing base (TCB) and the threat models described herein rely on the inability of an attacker to compromise the KGC. In one embodiment, the KGC employs tamper resistant hardware and other security measures to prevent compromise. Another alternative is to distribute the trust for KGC by using threshold cryptography, in which the KGC is controlled by multiple entities and a set of entities (e.g., t-out-of-n, t<n) must collaborate to recover the cryptographic keys. The KGC generates the symmetric keys for the each logging machine and each auditor and distributes them before the deployment of the system. The KGC optionally stores the root keys in a tamper resistant manner as described, and then derive the keys for each logging machine or auditor for each time period properly.

As used herein, the term "logging machine" refers to a computing device, such as the logging machine 112, that generates and stores log messages related to events that occur during operation of the logging machine 112. In any modern computer system, there is an event logging mechanism which logs the important occurrences (e.g., who logs into the system, which user manipulated which file). In FIG. 1, the logging machine 112 stores searchable encrypted log data 116. As is known in the art, the logging machine 112 generates logs for a single computing device (a "local" log) or receives logs from one or more computing devices via a data network or other suitable communication channel (a "remote" logger). The logging machine refers to this logging mechanisms that can be part (or a process) of a computer or operating system. The log messages include, but are not limited to, information about activities performed by software programs that logging machine executes, network traffic information, sensor data, and, in particular, data corresponding to the activities of users including log message records that may indicate malicious activity by an attacker. Examples of malicious activity include, but are not limited to, records of network port scans, attempts to execute privileged operations in the logging machine, unsuccessful login attempts, and the like. As described in more detail below, the logging machine 112 uses forward-secure encryption and signature processes to protect the privacy and integrity of log messages that are recorded before a potential attacker gains control of the logging machine 112. The threat models described herein assume that the logging machine can be compromised by the attacker. That is, cryptographic keys used to compute cryptographic tags and ciphertext can be recovered by the attacker. The logging machine accumulates the log messages of important events and then being audited by the auditor periodically.

As used herein, the term "auditor" refers to a computing device, such as the auditor 108, that is responsible for verifying the log messages generated by the logging machine 112. The auditor periodically obtains log messages from the logging machine, and cryptographically verifies their authenticity and integrity. The auditor may also conduct encrypted searches on those log messages, and also may be given a right to decrypt log messages if the system design permits. In the embodiment of FIG. 1, the auditor 108 is granted access to search on encrypted log messages for a given keyword w, and identify the ciphertexts containing keyword w. However, due to confidentiality and privacy requirements, the auditor 108 is not given the secret key which is used to encrypt log messages.

In general, the auditor 108 has search access to perform keyword searches on encrypted and digitally signed searchable representations (SRs) that include a predetermined dictionary of keywords that may be present in one or more log messages. The auditor can perform keyword searches to identify log entries that include one or more keywords, but by default the auditor does not have full access to the plaintext of any of the log entries in the logging machine. In some circumstances, the KGC provides limited access to the auditor to view the plaintext log messages for a portion of the log messages that the logging machine generates during operation. For example, during an investigation into a potential compromise of the logging machine 112, the auditor 108 receives permission to view the plaintext of selected log messages that match a keyword search. The KGC 104 provides either the decryption keys or the decrypted plaintext to the auditor 108. Alternatively, the auditor 108 contacts a trusted third party authorized by law, that can decrypt the encrypted log messages containing one or more keywords w and send them to the auditor, which prevents exposure of any secret keys to the auditor 108. This trusted third party can be the KGC 104 or the KGC 104 may delegate the authentication credentials to an external entity, which is also authorized and stores cryptographic keys in a tamper resistant manner.

In many configurations the KGC 104, auditor 108, and logging machine 112 are formed from at least three distinct computing devices that are often separated geographically, although in some embodiments a single computing device could implement the functionality of all three components using, for example, virtual machines, containers, or other partitioning techniques that are known to the art to provide secure separation and communicative coupling between the operation of the logging machine, KGC, and the auditor. Each of the logging machine, KGC, and auditor includes at least one digital processor, at least one memory device, and network interface devices that transmit and receive data through data networks such as local or wide area networks. The auditor also includes input and output (I/O) devices that present the results of search queries and, in some configurations, the plaintext of selected log messages from the logging machine 112. Examples of I/O devices include keyboards, mice, touchscreen interfaces, visual display devices, audio input and output devices, printers, and the like. The memory devices including both volatile random access memory (RAM) and non-volatile data storage devices such as magnetic drives or solid state storage devices.

During operation, the system 100 performs a key generation process, searchable encryption process, and an auditing process: $(K_0, x_0, y_0) \leftarrow \text{FASE.K}_g(1\kappa)$. The KGC 104 generates secret keys $z_1 \leftarrow \varepsilon.\text{Gen}(1^\kappa)$ and $(z_2, x_0, Y_0) \xleftarrow{\$} \{0,1\}^\kappa$, and sets $K_0 \leftarrow (z_1, z_2)$. The KGC gives $(K_0, x_0, y_0)$ and $(z_2, x_0, y_0)$ to the logging machine 112 and auditor 108, respectively. The terms $x_0$, $y_0$, $z_1$, and $z_2$ each correspond to a symmetric cryptographic key. As discussed below, the key $z_1$ is used for encryption and decryption of the text in messages, the key $z_2$ is used to generate and access the encrypted SRs of keywords corresponding to each message, the key $x_0$ is used to generate a cryptographic signature of the message text (either plaintext or ciphertext), and the key $y_0$ is used to generate a cryptographic signature of the encrypted SR. Additionally, the logging machine 112 and auditor 108 generate updated versions of the keys $x_0$, $y_0$, $z_1$, and $z_2$ using a one-way function, such as a cryptographically secure hash function, to maintain forward security during operation. The old versions of keys are deleted from the memory of the logging machine 112 shortly after generation of the updated keys. Consequently, if an attacker compromises the logging machine 112, the attacker cannot view previously generated log messages or encrypted SRs. Additionally, the attacker cannot modify the encrypted log messages or SRs in a manner that is undetectable by the auditor 108 since any tampering with the encrypted log data invalidates the cryptographic signatures and the attacker is unable to generate new cryptographic signatures for old log messages and SRs.

The logging process includes generation of log data in the logging machine 112 for various events that occur in one or more computing systems, including events that are of relevance to a security audit. The logging machine 112 logs the events, and generates cryptographic tags and searchable encrypted ciphertext vectors corresponding to the log messages as follows: $(\vec{1}, \vec{\sigma}, \vec{c}, s_{0,i}) \leftarrow \text{FASE.FSE}_{K0,x0,y0}(\vec{M})$. During a first time period $t_0$, the logging machine 112 records the first log message $M_0$ and obtains the first SR and ciphertext. The logging machine 112 also computes signatures $\sigma \leftarrow F_{y0}(I_0)$ and $s_0 \leftarrow F_{x0}(M_0)$, and updates the keys $K_1$ (including the two separate symmetric keys $z_1$ and $z_2$) via $K_1 \leftarrow Upd_2(K_0)$ to generate updated keys $K_1 = (z_1', z_2')$. The signature $\sigma$ is a cryptographic signature of the encrypted SR $I_0$ for the particular log message $M_0$ and the signature $s_0$ is a cryptographic signature of the contents of the message $M_0$. The logging machine 112 uses the first key $z_1$ to generate the signature $s_0$ for the contents of the log message $M_0$ based on either the plaintext or ciphertext of the log message. The logging machines 112 uses the second key $z_2$ to generate the signature $\sigma$ for the encrypted SR $I_0$. In one embodiment, the logging machine uses the keys $z_1$ and $z_2$ during a predetermined time period and updates both encryption keys $z_1$ and $z_2$ at the end of each time period to provide forward security for the logging messages and SRs that were generated during previous time periods. The logging machine 112 optionally groups all of the encrypted log messages, SRs, and corresponding cryptographic signatures for a single time period together for transmission to one or both of the auditor 108 and the KGC 104. In another embodiment, the logging machine 112 updates the keys $z_1$ and $z_2$ after encrypting and signing the log message text and SR for each log message or for a predetermined number of consecutive log messages. In the time period embodiment, the logging machine 112 continues to process groups of log messages during subsequent time periods $t_1 \ldots t_{w-1}$. The logging machine 112 continues to generate log messages $M_1 \ldots M_{l-1}$ and continues to compute cryptographic tags, SRs, and ciphertexts. During a subsequent time period $t_w$ the logging machine performs the following operational sequence:

a. $(I_w, c_l) \leftarrow SSE.Add_{K_w}(I_{w-1}, M_l)$
b. $\sigma_w \leftarrow F_{y_w}(I_w)$
c. $s_l \leftarrow F_{x_l}(c_l)$, $s_{0,l} \leftarrow F_{x_l}(s_l \| s_{0,l-1})$
d. $K_{w+1} \leftarrow Upd_2(K_w)$
e. At the end of $t_w$, the logging machine 112 generates the following output: $\langle \vec{I} = (I_0, \ldots, I_w), \vec{\sigma} = (\sigma_0, \ldots, \sigma_w), \vec{c} = (c_0, \ldots, c_l), s_{0,l} \rangle$ The auditor 108 receives the output data $(\vec{I}, \vec{\sigma}, \vec{c}, s_{0,l})$ from the logging machine 112 and performs searches for keywords w in the encrypted log messages from the logging machine 112, although the auditor 108 does not have full access to the plaintext contents of the log messages. The auditing process to search for a keyword w in the output from the logging machine is described by the following expression: $(M, b) \leftarrow FASE.FAVS_{z_2, x_0, y_0}((\vec{I}, \vec{\sigma}, \vec{c}, s_{0,l}, w)$. In more detail, the auditor 108 verifies the authenticity and integrity of data from the logging machine 112 and then searches for the keyword w as set forth below:

a. $s'_j \leftarrow F_{x_j}(c_j)$, $s'_0 \leftarrow F_{x_j}(s'_j \| s'_{j-1})$ and $x_j \leftarrow Upd_1(x_{j-1})$ for $j=1, \ldots, l$ where $s'_0 \leftarrow F_{x_0}(c_0)$. If $s'_{0,l} = s_{0,l}$ then set b=1 and continue or else set b=0 and abort, which indicates a failure to verify the cryptographic signature for at least one log message and that at least one log message over the series of log messages 0–l has been modified, potentially by an attacker.
b. If $\sigma_j = F_{y_j}(I'_j)$ where $y_j \leftarrow Upd_1(y_{j-1})$, $j=1, \ldots, n$, then set b=1 and continue, else set b=0 and abort, which indicates that at least one of the SRs for the log data have been modified, potentially by an attacker.
c. Search for the keyword w as $(c_n, b) \leftarrow SSE.Search_{z_2}(\vec{I}, w)$. If b=0 then abort, else $c_n$ is the set of ciphertext data that include keyword w that are generated during a single time period $t_n$.
d. The auditor 108 optionally requests decryption of the data $c_n$ that include the keyword w. If the KGC 104 authorizes the request, the auditor 108 receives $K_n$ to decrypt the ciphertext $c_n$, or alternatively the auditor 108 sends $c_n$ to a trusted third party that is responsible for the decryption.

Figure 2:
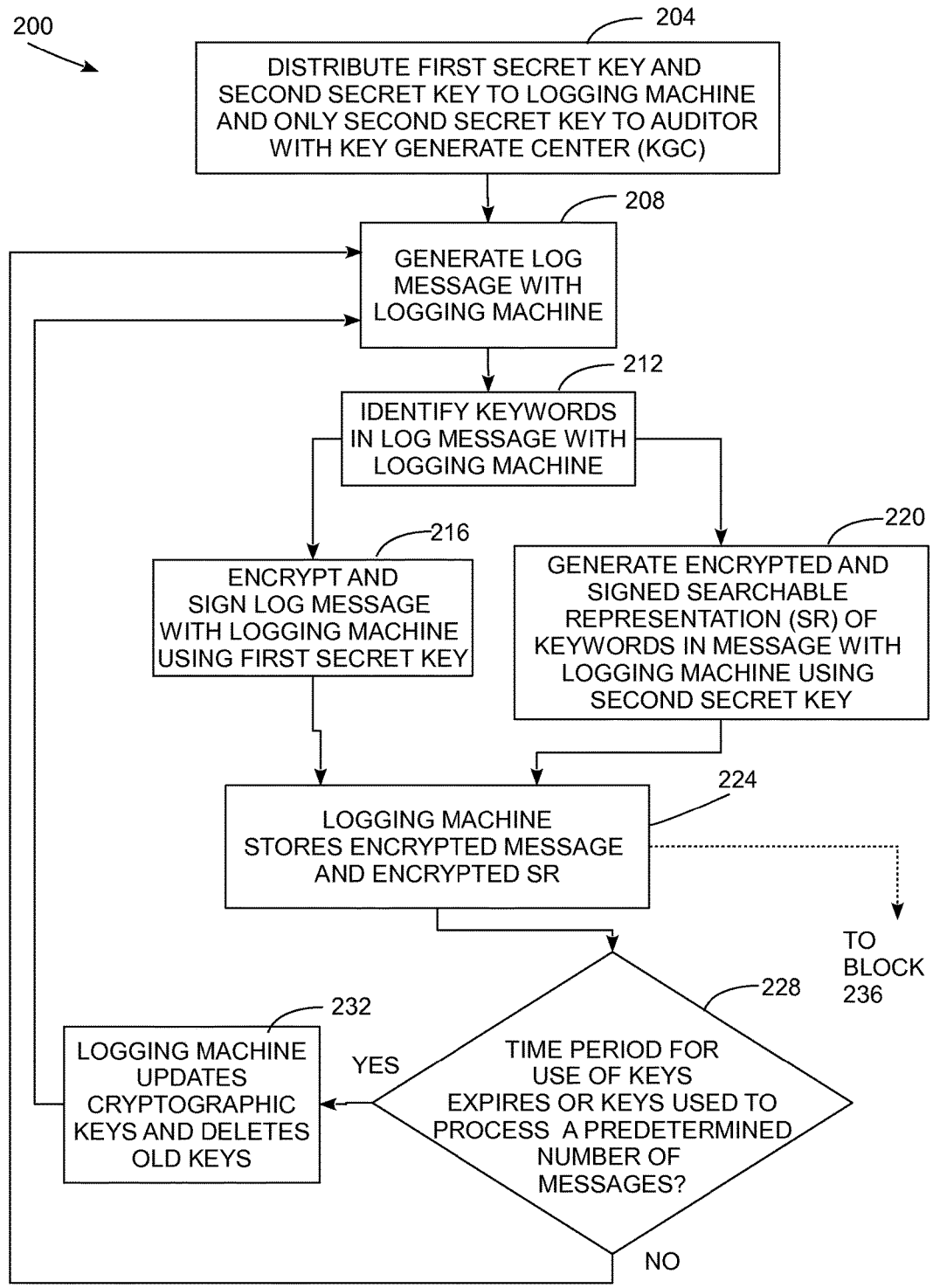
FIG. 2 is a block diagram of a process for the generation of encrypted log messages and for searching encrypted searchable representations of the encrypted log messages with optional decryption of selected log messages in the system of FIG. 1.
Figure 2:
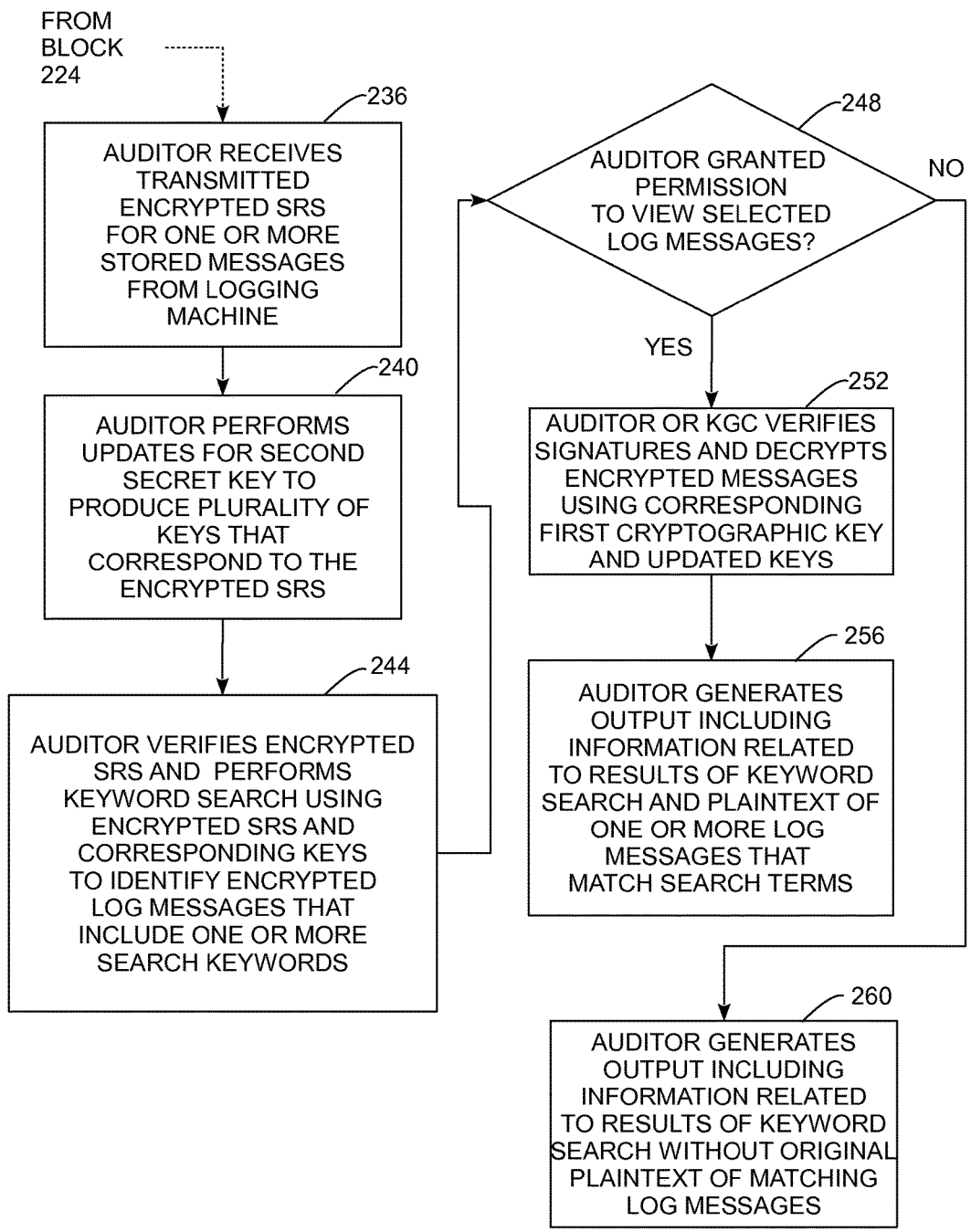

FIG. 2 depicts a process 200 that is an exemplary implementation the foregoing processes for secure log generation and auditing. In the discussion of FIG. 2, a reference to the process 200 performing a function or action refers to the operation of one or more processors to execute stored program instructions to perform the function or action in association with other components in a logging system. The process 200 is described in conjunction with the system 100 of FIG. 1 for illustrative purposes.

Process 200 begins as the KGC 104 generates and distributes the first cryptographic key ($z_1$) and the second cryptographic key ($z_2$) to the logging machine 112 and the KGC 104 distributes only the second secret key to the auditor 108 (block 204). The first and second keys are symmetric cryptographic keys that form a shared secret between the KGC 104 and the logging machine 112 (for both the first and second keys) and between the KGC 104, logging machine 112, and the auditor (for only the second key). In some embodiments, the KGC 104 also generates the signing key for the cryptographic messages (key $x_0$) and the signing key for the encrypted SRs (key $y_0$). The KGC 104 distributes the keys $x_0$ and $y_0$ to at least the logging machine 112 and distributes the key $y_0$ and optionally they key $x_0$ to the auditor 108. The KGC 104 uses an existing secure key distribution mechanism that enables transmission of the first and second keys over a network in a manner where an attacker cannot observe or manipulate the keys during transmission. As described above, the logging machine 112 receives the first key to encrypt and sign logged messages M and the second key to generate and sign the data structures for the searchable representation (SR) I that corresponds to the keywords in each message M.

Process 200 continues as the logging machine 112 generates a log message (block 208) and identifies keywords in the log message (block 212). The logging machine 112 generates the logging message in response to an event that occurs during operation of the logging machine 112. In many instances, the logging machine 112 is a server, personal computer, or other computing device that performs some activity in a larger computing system. A logging program (e.g. syslog or equivalent) generates a log entry in response to an event that occurs during the execution of one or more programs in the logging machine. The logging machines uses, for example, a parsing and tokenization process to identify keywords that correspond to a predetermined dictionary of keywords that are expected to be found in log messages.

During process 200, the logging machine 112 encrypts and signs the log message (block 216) and generates a cryptographically signed encrypted SR that includes entries for all of the identified keywords in the message (block 220). In the system 100, the logging machine 112 encrypts the log message with the first key ($z_1$) and signs either the plaintext or ciphertext of the log message with the signing key $x_0$. The logging machine 112 also generates the encrypted SR using the second key ($z_2$) and generates the cryptographic signature for the encrypted SR using the signing key $y_0$. The logging machine 112 performs the processing of blocks 216 and 220 in any order or concurrently during process 200. The logging machine 112 stores the encrypted and message data c with the cryptographic signature s and the encrypted SR I with the signature a for the message in a memory (block 224).

During process 200, the logging machine 112 updates the symmetric cryptographic keys $x_0$, $y_0$, $z_1$, and $z_2$ to preserve forward security on the logging machine. As described above, in one embodiment, the logging machine applies the update functions Upd1 and Upd2 to generate updated versions of each of the keys $x_0$, $y_0$, $z_1$, and $z_2$ using a one-way cryptographically secure hash function. The logging machine 112 then deletes the old versions of the cryptographic keys from memory so that even if an attacker gains control of the logging machine, the previously stored encrypted and signed log messages and the stored signed encrypted SRs cannot be altered by the attacker in a manner that is undetectable to the auditor 108. During the process 200, the logging machine identifies if either the expiration of a predetermined time period or if the logging machine has used the keys $x_0$, $y_0$, $z_1$, and $z_2$ for a predetermined number of log messages (e.g. one log message) (block 228). The logging machine 112 then performs the update process to generate updated versions of the cryptographic keys and deletes the old cryptographic keys (block 232). The process 200 returns to the block 208 for generation and processing of the next log message after the generation of the updated keys in block 232 or in situations where then logging machine 112 does not perform the key update process (block 228).

During process 200, the logging machine 112 continues operation as described in the processing of blocks 208-228. During the process 200, the logging machine 112 also transmits data to the auditor 108 and the auditor 108 receives the transmitted data from the logging machine 112 (block 236). The transmitted data include at least the encrypted SRs and the signatures for the encrypted SRs, and in some configurations the logging machine 112 also transmits the encrypted logging messages and the corresponding message signatures.

The auditor 108 performs a synchronization operation to perform any necessary update operations on the keys $x_0$, $y_0$, and $z_2$ to ensure that the auditor 108 uses the same set shared symmetric keys for data verification and to access the encrypted SR that the logging machine used to generate the encrypted SR and produce signatures for the message and the encrypted SR (block 240). As described above, in some embodiments the logging machine generates a set of encrypted SRs and optionally messages during a predetermined time period when the logging machine 112 uses a single set of keys for encrypting and signing the relevant data that are transmitted to the auditor 108. The auditor 108 receives a timestamp corresponding to the encrypted data, which the auditor 108 uses to perform any necessary update operations on the copy of the cryptographic keys $x_0$, $y_0$, and $z_2$ that the auditor 108 uses for signature verification (keys $x_0$ and $y_0$) and access to the encrypted SR (key $z_2$) in the data from the logging machine 112. In another embodiment, the auditor 108 requests one or more encrypted SRs from the logging machine 112 and receives the signed encrypted SRs with an index number. The auditor 108 uses the index number to identify the number of updates that the auditor 108 performs to generate the appropriately updated versions of the keys $x_0$, $y_0$, and $z_2$.

Process 200 continues as the auditor 108 verifies the integrity of the encrypted SRs that are received from the logging machine 112 and performs a search operation for one or more search keywords (block 244). Each encrypted SR includes entries that specify the presence or absence of keywords in the original log message. The auditor uses the appropriately updated version of the signature verification cryptographic key $y_0$ to verify the signature of the encrypted SRs from the logging machine 112. If the verification succeeds, then the auditor 108 uses the appropriate version of the second cryptographic key $z_2$ to access the encrypted SRs for one or more of the log messages to identify the presence or absences of the keywords from the encrypted log messages corresponding to the encrypted SRs. However, as noted above the auditor 108 does not gain full access to the plaintext of the encrypted log messages, but instead merely identifies the encrypted log messages that include the keyword or keywords in the search query. In many configurations, the auditor 108 is only granted permission to identify the encrypted log entries that include the search term (block 248) and the auditor 108 generates an output that specifies the encrypted log messages that match the search keywords without specifying the plaintext contents of the matching log messages (block 260).

In some configurations of the process 200, the KGC 104 enables the auditor 108 to decrypt a portion of the encrypted log messages from the logging machine 112 (block 248). The auditor 108 either receives at least one version of the symmetric cryptographic key z1 from the logging machine 112 or the KGC decrypts the encrypted messages and transmits the plaintext contents of the encrypted messages to the auditor 108 without divulging the symmetric key z1 to the auditor 108 (block 252). For example, in some situations the auditor 108 is granted access to the plaintext of log messages that match the terms of the keyword search query. If the auditor 108 receives the cryptographic key $z_1$ then the auditor technically has the ability to reconstruct all future versions of the key $z_1$ using the update functions, but the auditor 108 cannot not generate any earlier versions of the key $z_1$. The KGC 104 optionally generates a new key $z_1$ for the logging device to prevent the auditor 108 from accessing future encrypted log messages. In the configuration in which the KGC 104 receives the encrypted messages from the logging machine 112 and transmits the plaintext data to the auditor 108, the KGC 104 optionally uses a secondary form of encryption and authentication to preserve the privacy and integrity of the plaintext log messages during transmission through the data network without divulging the contents of the key $z_1$ to the auditor 108.

In either configuration, the KGC 104 or the auditor 108 verifies the cryptographic signatures from the logging machine 112 using the appropriately updated versions of the key $x_0$ to ensure that the contents of the log messages have not been altered by an attacker. During process 200, the auditor 108 generates an output that includes both an identification of the log messages that matched the keyword search and the plaintext contents of the log messages in response to a successful verification of the authenticity of the log messages (block 256). Of course, the system 100 can be configured to generate a warning or alert in the event that the cryptographic signatures corresponding to one or more log messages fail to match the contents of the log messages, which indicates the possibility that an attacker altered the log messages. Thus, during process 200, the system 100 prevents an attacker who gains control of the logging machine 112 from accessing the data of previously generated log messages and encrypted SRs, and prevents the attacker from modifying the previously generated log messages and encrypted SRs in a manner that is undetectable by the auditor 108.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed herein in the following claims.

What is claimed:

1. A method for searching encrypted log data comprising:
generating with a logging machine a first log message include first plaintext content;
identifying with the logging machine at least one keyword in the first log message;
encrypting with the logging machine the first log message using a first cryptographic key to produce a first encrypted log message;
generating with the logging machine a first encrypted searchable representation of the first message including the at least one keyword using a second cryptographic key, the second cryptographic key being different than the first cryptographic key;
transmitting with the logging machine the first encrypted searchable representation to an auditor;
performing with the auditor a search to identify at least one search keyword in the first encrypted searchable representation, the auditor using the second cryptographic key to access the first encrypted searchable representation;
generating with a key generation center (KGC) the first cryptographic key, the second cryptographic key, and a third cryptographic key;
distributing with the KGC the first cryptographic key, the second cryptographic key, and the third cryptographic key to the logging machine prior to the generation of the first encrypted message and the first encrypted searchable representation;
distributing with the KGC only the second cryptographic key and the third cryptographic key to the auditor prior to performing the search to identify the at least one search keyword; and
generating with the auditor a first output indicating presence or absence of the at least one search keyword from the first log message, the first output not including the first plaintext content of the first log message.

2. The method of claim 1 further comprising:
applying with the logging machine a one-way function to the first cryptographic key to generate an updated first cryptographic key, the updated first cryptographic key being different than the first cryptographic key;
applying with the logging machine the one-way function to the second cryptographic key to generate an updated second cryptographic key, the updated second cryptographic key being different than the second cryptographic key;
generating with the logging machine a second log message include second plaintext content;
identifying with the logging machine at least one keyword in the second log message;
generating with the logging machine a second encrypted searchable representation of the second message including the at least one keyword using the updated second cryptographic key;
encrypting with the logging machine the second log message using the updated first cryptographic key to produce a second encrypted log message;
transmitting with the logging machine the second encrypted searchable representation to the auditor;
applying with the auditor the one-way function to the second cryptographic key to generate the updated second cryptographic key;
performing with the auditor another search to identify the at least one search keyword in the second encrypted searchable representation, the auditor using the updated second cryptographic key to access the second encrypted searchable representation; and
generating with the auditor a second output indicating presence or absence of the at least one search keyword from the second log message, the second output not including the second plaintext content of the second log message.

3. The method of claim 2, wherein the logging machine generates the first updated key and the second updated key in response to expiration of a predetermined time period, the second log message being generated after expiration of the predetermined time period.

4. The method of claim 2, wherein the logging machine generates the first updated key and the second updated key in response to use of the first cryptographic key to generate the first encrypted message and the use of the second cryptographic key to generate the first searchable encrypted representation.

5. The method of claim 2 further comprising:
deleting with the logging machine the first cryptographic key in response to the generation of the updated first cryptographic key to preserve forward security of the first encrypted log message; and
deleting with the logging machine the second cryptographic key in response to the generation of the updated second cryptographic key to preserve forward security of the first encrypted searchable representation.

6. The method of claim 1 further comprising:
generating with the logging machine a first cryptographic signature corresponding to the first encrypted searchable representation using a third cryptographic key;
transmitting with the logging machine the first cryptographic signature to the auditor in association with the first encrypted searchable representation; and
performing with the auditor a search to identify at least one search keyword in the first encrypted searchable representation only in response to verification of the first cryptographic signature using the third cryptographic key.

7. The method of claim 1 further comprising:
transmitting with the logging machine the first encrypted log message to the auditor;
distributing with the KGC the first cryptographic key to the auditor;
decrypting with the auditor the first encrypted cryptographic message using the first cryptographic key; and
generating with the auditor a second output including the first plaintext of the first encrypted message.

8. The method of claim 7, further comprising:
generating with the logging machine a cryptographic signature of the first encrypted message using the third cryptographic key;
transmitting with the logging machine the cryptographic signature to the auditor in association with the first encrypted message; and
generating with the auditor the second output including the first plaintext of the first encrypted message only in response to verification of the cryptographic signature using the third cryptographic key.

9. The method of claim 1 further comprising:
transmitting with the logging machine the first encrypted log message to the KGC;
decrypting with the KGC the first encrypted cryptographic message using the first cryptographic key;

transmitting with the KGC the first plaintext of the first log message to the auditor; and generating with the auditor a second output including the first plaintext of the first encrypted message.

10. An encrypted log generation and audit system comprising:

a logging machine communicatively coupled to an auditor and a key generation center (KGC), the logging machine being configured to:
  generate a first log message include first plaintext content;
  identify at least one keyword in the first log message;
  encrypt the first log message using a first cryptographic key to produce a first encrypted log message;
  generate a first encrypted searchable representation of the first message including the at least one keyword using a second cryptographic key, the second cryptographic key being different than the first cryptographic key; and
  transmit the first encrypted searchable representation to the auditor;

the auditor communicatively coupled to the logging machine and the KGC, the auditor being configured to:
  perform a search to identify at least one search keyword in the first encrypted searchable representation, the auditor using the second cryptographic key to access the first encrypted searchable representation; and
  generate a first output indicating presence or absence of the at least one search keyword from the first log message, the first output not including the first plaintext content of the first log message; and the KGC communicatively coupled to the logging machine and the auditor, the KGC being configured to:
  generate the first cryptographic key, the second cryptographic key, and a third cryptographic key;
  distribute the first cryptographic key, the second cryptographic key, and the third cryptographic key to the logging machine prior to the generation of the first encrypted message and the first encrypted searchable representation; and
  distribute only the second cryptographic key and the third cryptographic key to the auditor prior to performing the search to identify the at least one search keyword.

11. The system of claim 10, the logging machine being further configured to:
  apply a one-way function to the first cryptographic key to generate an updated first cryptographic key, the updated first cryptographic key being different than the first cryptographic key;
  apply the one-way function to the second cryptographic key to generate an updated second cryptographic key, the updated second cryptographic key being different than the second cryptographic key;
  generate second log message include second plaintext content;
  identify at least one keyword in the second log message;
  generate a second encrypted searchable representation of the second message including the at least one keyword using the updated second cryptographic key;
  encrypt the second log message using the updated first cryptographic key to produce a second encrypted log message; and
  transmit the second encrypted searchable representation to the auditor; and the auditor being further configured to:
  apply the one-way function to the second cryptographic key to generate the updated second cryptographic key;
  perform another search to identify the at least one search keyword in the second encrypted searchable representation, the auditor using the updated second cryptographic key to access the second encrypted searchable representation; and
  generate a second output indicating presence or absence of the at least one search keyword from the second log message, the second output not including the second plaintext content of the second log message.

12. The system of claim 11, the logging machine being further configured to:
  generate the first updated key and the second updated key in response to expiration of a predetermined time period, the second log message being generated after expiration of the predetermined time period.

13. The system of claim 11, the logging machine being further configured to:
  generate the first updated key and the second updated key in response to use of the first cryptographic key to generate the first encrypted message and the use of the second cryptographic key to generate the first searchable encrypted representation.

14. The system of claim 11, the logging machine being further configured to:
  delete the first cryptographic key in response to the generation of the updated first cryptographic key to preserve forward security of the first encrypted log message; and
  delete the second cryptographic key in response to the generation of the updated second cryptographic key to preserve forward security of the first encrypted searchable representation.

15. The system of claim 10, the logging machine being further configured to:
  generate a first cryptographic signature corresponding to the first encrypted searchable representation using a third cryptographic key; and
  transmit the first cryptographic signature to the auditor in association with the first encrypted searchable representation; and the auditor being further configured to:
  perform a search to identify at least one search keyword in the first encrypted searchable representation only in response to verification of the first cryptographic signature using the third cryptographic key.

16. The system of claim 10, the logging machine being further configured to:
  transmit the first encrypted log message to the auditor;
the KGC being further configured to:
  distribute the first cryptographic key to the auditor; and
the auditor being further configured to:
  decrypt the first encrypted cryptographic message using the first cryptographic key; and
  generate a second output including the first plaintext of the first encrypted message.

17. The system of claim 16, the logging machine being further configured to:
  generate a cryptographic signature of the first encrypted message using the third cryptographic key; and
  transmit the cryptographic signature to the auditor in association with the first encrypted message; and the auditor being further configured to:
   generate the second output including the first plaintext of the first encrypted message only in response to verification of the cryptographic signature using the third cryptographic key.

18. The system of claim 10, the logging machine being further configured to:
   transmit the first encrypted log message to the KGC;
the KGC being further configured to:
   decrypt the first encrypted cryptographic message using the first cryptographic key; and
   transmit the first plaintext of the first log message to the auditor; and the auditor being further configured to:
   generate a second output including the first plaintext of the first encrypted message.

* * * * *